(12) United States Patent
Shay

(10) Patent No.: US 7,225,582 B2
(45) Date of Patent: Jun. 5, 2007

(54) MODIFIED FISHHOOK FOR CATCH AND RELEASE APPLICATIONS

(76) Inventor: Robert Shay, P.O. Box 108, Pope Valley, CA (US) 94567

(*) Notice: Subject to any disclaimer, the term of this patent is extended or adjusted under 35 U.S.C. 154(b) by 0 days.

(21) Appl. No.: 10/843,947

(22) Filed: May 12, 2004

(65) Prior Publication Data
US 2005/0252073 A1 Nov. 17, 2005

(51) Int. Cl.
A01K 83/00 (2006.01)

(52) U.S. Cl. .................................... 43/43.16

(58) Field of Classification Search .............. 43/43.16, 43/43.1, 44.8; D22/144
See application file for complete search history.

(56) References Cited

U.S. PATENT DOCUMENTS

| | | | |
|---|---|---|---|
| 1,754,567 A | | 4/1930 | Newell |
| 2,494,407 A | | 1/1950 | Rhodes |
| 2,514,527 A | * | 7/1950 | Verhota ............ 43/44.82 |
| 2,564,216 A | * | 8/1951 | Stark ............... 43/44.8 |
| 2,617,226 A | | 11/1952 | Yoshii |
| 2,841,914 A | | 7/1958 | Butler |
| 2,861,383 A | * | 11/1958 | Gray ............... 43/53.5 |
| 2,906,054 A | * | 9/1959 | Morehead ......... 43/43.16 |
| 3,128,572 A | * | 4/1964 | McVay ............ 43/42.45 |
| 3,417,503 A | | 12/1968 | Meulnart |
| D242,919 S | * | 1/1977 | Petersen, Jr. ........ D22/144 |
| 4,028,838 A | | 6/1977 | Flower |
| 4,232,470 A | * | 11/1980 | Steffick, Jr. ....... 43/43.16 |
| 4,942,689 A | | 7/1990 | Link et al. |
| 4,953,321 A | * | 9/1990 | Furuta .............. 43/43.16 |
| 5,040,325 A | | 8/1991 | Herrmann |
| D324,407 S | * | 3/1992 | Snyder ............. D22/126 |
| 5,097,622 A | | 3/1992 | James |
| 5,197,220 A | | 3/1993 | Gibbs et al. |
| 5,339,562 A | | 8/1994 | Guerra et al. |
| 5,347,744 A | | 9/1994 | Getschel |
| D370,048 S | | 5/1996 | Smith |
| 5,685,108 A | | 11/1997 | Lepage |
| 5,890,316 A | * | 4/1999 | Rodgers et al. ....... 43/43.16 |
| 5,901,493 A | | 5/1999 | Tolliver |
| 6,073,385 A | | 6/2000 | Sano |
| 6,085,456 A | | 7/2000 | Battaglia |
| 6,164,007 A | | 12/2000 | Van Der Hoven et al. |
| 6,266,915 B1 | | 7/2001 | Stump |
| 6,289,628 B1 | | 9/2001 | Perez |
| D467,989 S | * | 12/2002 | Belland ............. D22/144 |
| D469,502 S | | 1/2003 | Shelton |
| 6,519,895 B1 | | 2/2003 | Bennett |
| 6,560,917 B2 | | 5/2003 | Van Der Hoven et al. |

* cited by examiner

Primary Examiner—Michael J. Carone
Assistant Examiner—Bret Hayes
(74) Attorney, Agent, or Firm—Weide & Miller, Ltd.

(57) ABSTRACT

A fishhook for use in catch and release application or when it is desired to inflict minimal damage to the fish. The hook comprises an eye, shank, bend and point. One or more dogs are located on the bend, the shank, or both. The dogs comprise non-barbed raised surfaces or structures. In one or more various embodiments the dogs comprise toroidal shaped raised surfaces, star shaped raised surfaces, raised surfaces with rough outer edges, raised surfaces having inwardly sloping side surfaces, crescent shaped raised surfaces, raised surfaces comprising nubs or cone shapes, or any combination thereof. One or more dogs may also be located on the shank.

14 Claims, 3 Drawing Sheets

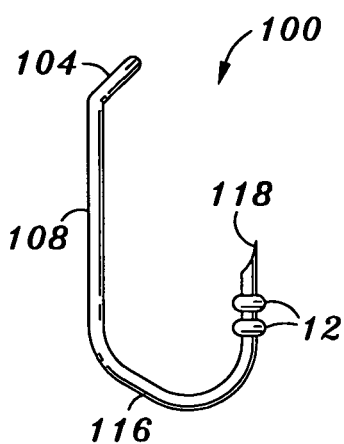
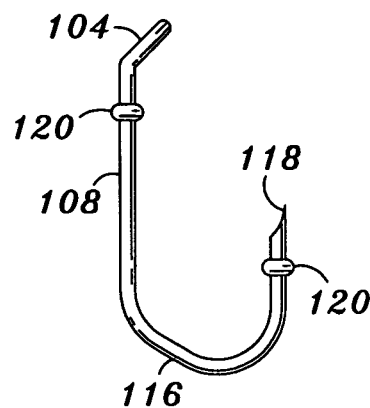
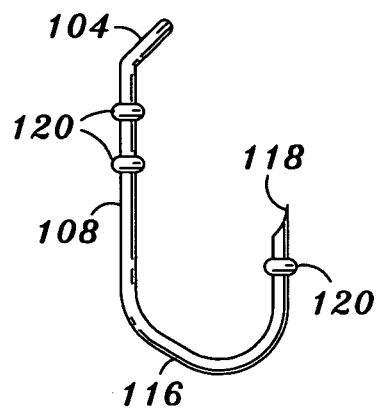
Fig. 1A    Fig. 1B    Fig. 1C
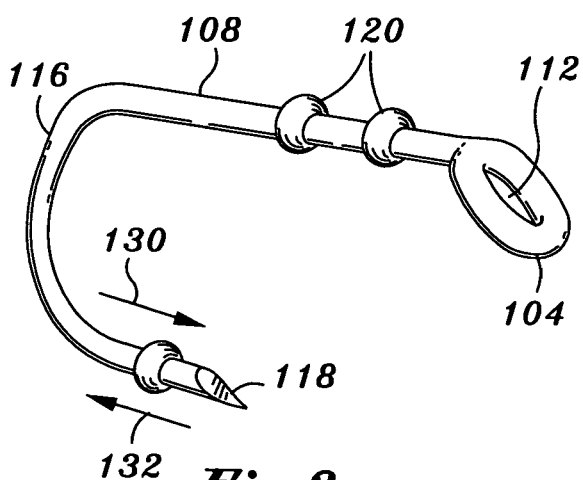
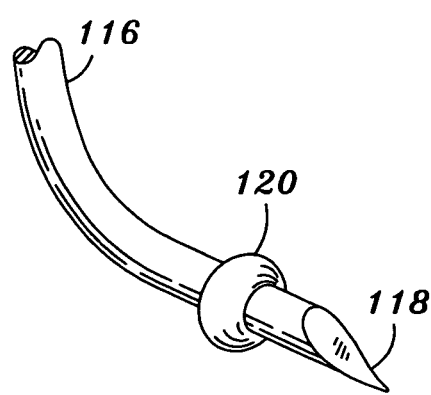
Fig. 2    Fig. 3
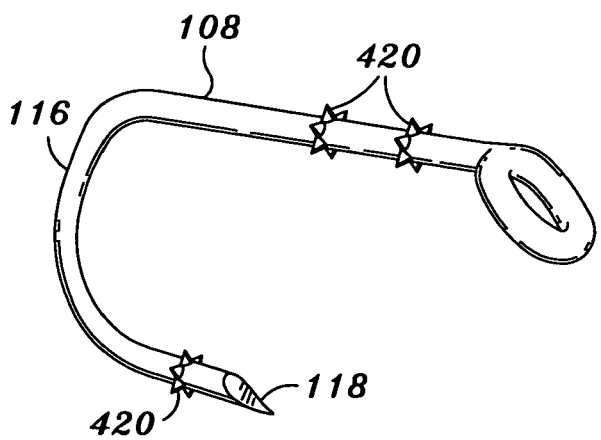
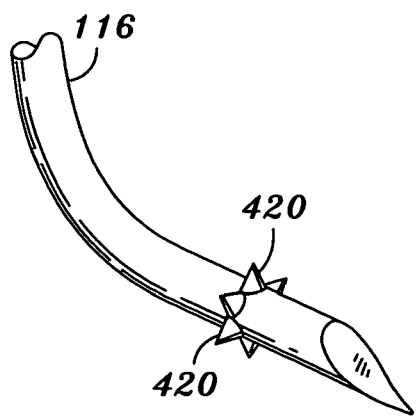
Fig. 5    Fig. 4

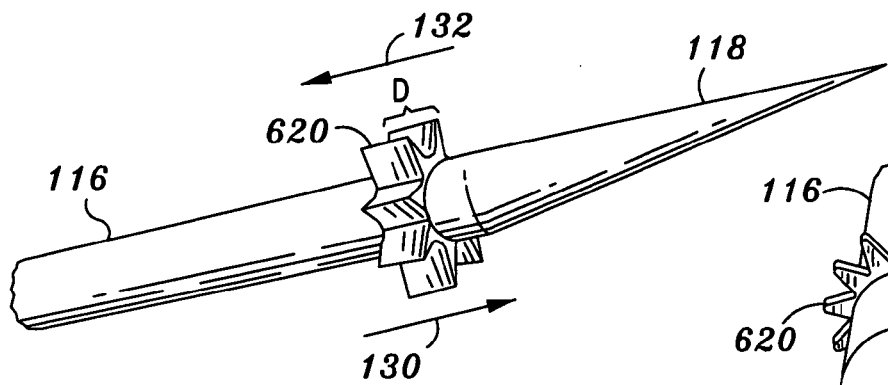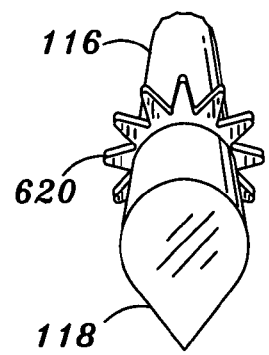
*Fig. 6A*
*Fig. 6B*
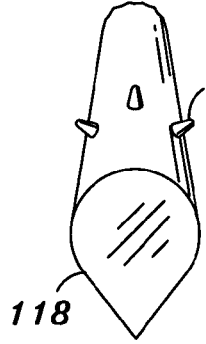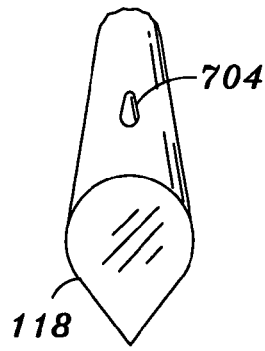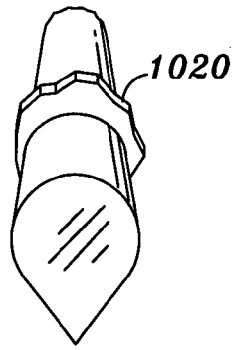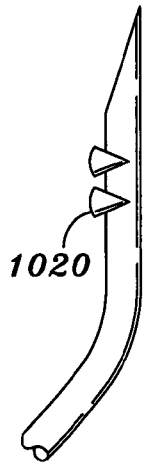
*Fig. 7*  *Fig. 8*  *Fig. 10*  *Fig. 11*
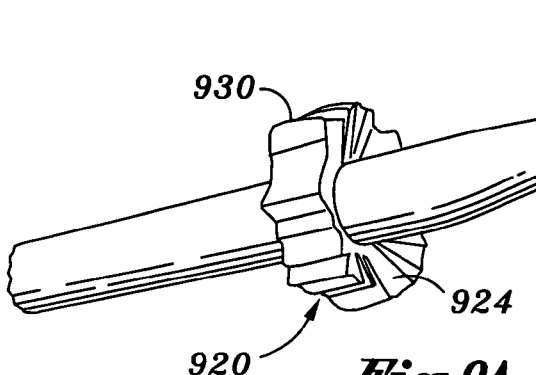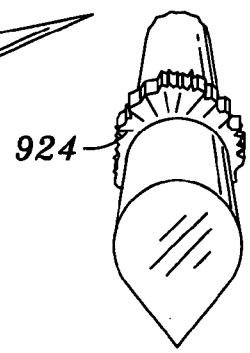
*Fig. 9A*
*Fig. 9B*

MODIFIED FISHHOOK FOR CATCH AND RELEASE APPLICATIONS

FIELD OF THE INVENTION

The invention relates to fishing, and in particular to an improved fishhook.

RELATED ART

Fishing is a popular activity for sportsmen, outdoor recreationists, and environmentalists. While many fishermen fish to obtain a source of food, a growing segment of the fishing population perform catch and release, whereby once a fish is caught and landed, the fish is subsequently released back into the water. This maintains the fish stock for future outings and future generations of fishermen. Furthermore, catch and release may be considered to be a more humane means by which to enjoy fishing because the fish is not permanently harmed. Moreover, catch and release is becoming increasingly more popular as more and more people compete for the same resources offered by a limited number of streams and lakes.

Prior art fishhooks and lures share a common characteristic by having a generally sharp and pointed barb located near the point of the bend, i.e. hooked portion of the hook. By way of example, U.S. Pat. No. 6,560,917 issued to Van Der Hoven et al., U.S. Pat. No. 1,754,567 issued to Newell, and U.S. Pat. No. 2,494,407 issued to Rhodes all have a sharp and pointed barb pointed in an opposing direction from the pointed tip of the hook.

While this configuration has been used for hundreds of years and works well for securing the hook within the fish's mouth, it suffers from numerous drawbacks. One such drawback arises when the hook is used for catch and release. In such a situation, removing the barb hook from the fish's mouth undesirably harms the fish because when the hook is removed the sharp and pointed barb rips the flesh of the fish thereby leading to bleeding, potential infection, and potentially interfering with the fish's normal feeding habits. This can result in the permanent harm of the fish after release which undesirably reduces catch and release opportunities on subsequent fishing expeditions. Moreover, it may be considered by many to be inhumane to harm the fish using an aggressive barb.

Another drawback associated with this barb configuration arises when the hook is accidentally inserted or snagged on a user, such as when casting or baiting the hook. As occurs within the mouth of the fish, the hook may not be or removed from the snagged user without significant harm to the user. As a result the hook must often be pushed through the skin and the barb cut or otherwise removed before the hook can be removed in the opposing direction. As can be appreciated, this is an undesirable experience during what should otherwise be a pleasurable recreational activity.

The method and apparatus disclosed herein overcomes the drawbacks associated with prior art hook configurations.

SUMMARY

Disclosed herein is a modified fishhook configured with one or more dogs on the outer surface of the hook. The dogs are non-barbed, raised surfaces configured to not unduly damage or harm the fish. In one embodiment a fishhook is disclosed that comprises a non-barbed hook having a point at an end of the hook. A portion of the hook comprises a shank having a first end and a second end and an eye formed from or at the portion of the shank near the first end of the shank. The fishhook also comprises a bend having a first end and a second end, the first end of the bend being coupled to the second end of the shank. The second end of the bend is counled to the point at the end of the hook. At least one non-barbed dog extends around at least a portion of the bend such that the at least non-barbed dog is configured to engage a fish and hinder removal of the hook from the mouth of the fish. In addition, the at least one non-barbed dog is configured to minimally damage or harm the fish.

In one embodiment the dog comprises a toroidal shaped raised structure. In one embodiment the hook further comprises or includes one or more non-barbed dogs located on the shank near the first end. In one embodiment the shank has a circular cross section and the raised toroidal surface extends around the entire circumference of the shank. In addition, the eye may be configured to accept a swivel or a fishing line.

Also disclosed herein is a hook comprising a wire or stamped structure formed to generate a hook. In this embodiment the hook comprises a non-barbed hook having a first end and a second end, a portion of the second end of the hook having a pointed shape. The hook has an eye having an opening therein formed at the first end of the hook and a shank portion extending from the eye. A bend portion of the hook comprises at least one non-barbed raised surface having a substantially symmetric shape. The bend portion extends from the shank portion and the bend portion terminates at the second end of the hook. The at least one non-barbed raised surface is configured to engage a mouth of a fish thereby hindering the fish from coming loose from the hook when set in the mouth of the fish and to prevent or reduce laceration of the mouth of the fish when the hook is removed from the mouth of the fish.

It is further contemplated that the raised surface comprises a toroidal shaped dog that extends around at least one-half the circumference of the structure. In one embodiment the raised surface comprises a star shaped dog extending from the structure or the raised surface may comprise one or more nubs that extend around at least a portion of the structure. In one variation, the raised surface comprises one or more cones that extend radially from the structure. It is also contemplated that the raised surface may have a generally rough outer surface. In one embodiment the hook further comprises at least one non-barbed raised surface on the shank portion, such as, but not limited to, for holding bait.

Also disclosed is a method for forming a hook as described herein comprising the step of providing a length of wire having a first end and a second end and then forming an eye at the first end. This method then forms a shank and a bend. As shown herein, the method then swages a portion of the wire that forms the bend to thereby create a dog that extends at least a portion of the circumference around the wire in the bend. The forming of the bend and the swaging may occurring during the same step. An optional point may be sharpened at the second end.

In one variation of this method, the method further comprises forming one or more dogs on the shaft. In addition, the wire may be obtained from a spool of wire and the second end may be formed by cutting the wire. In one embodiment the eye and the bend are created by bending the wire. In one embodiment the wire comprises a first material and the method further comprises coating or forming the dog from a second material. It is also contemplated that the method may further comprise swaging a portion of the wire that forms the shank to thereby create a dog that extends at least a portion of the circumference around the wire that forms the shank.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 1A, 1B, and 1C illustrate side pan views of an exemplary fishhook having one or more toroidal shaped dogs.

FIGS. 2 and 3 illustrate perspective views of the hook and dog of FIG. 1.

FIGS. 4–5 illustrate perspective views of a hook having a cone shaped dog.

FIGS. 6A & 6B illustrate perspective views of a star shaped dog.

FIGS. 7 and 8 illustrate perspective views of a nub shaped dog.

FIGS. 9A & 9B illustrate a perspective view of a dog having a rough outer surface.

FIGS. 10 and 11 illustrate perspective views of an inwardly tapered dog.

DETAILED DESCRIPTION

Figure 12:
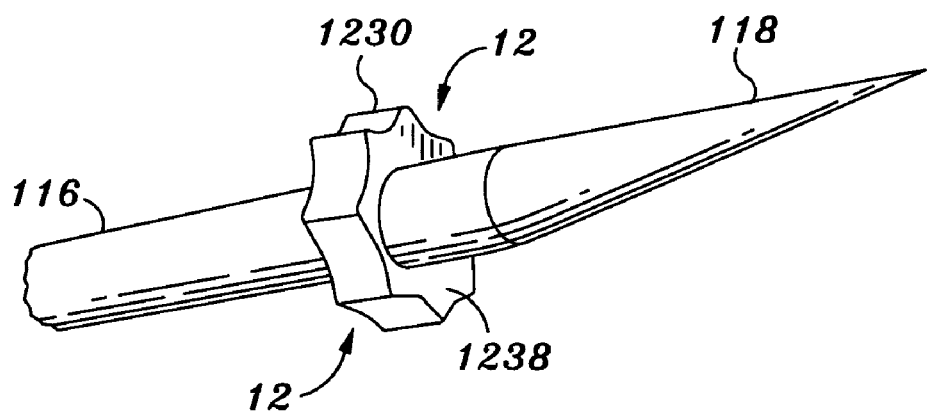
FIG. 12 illustrates a perspective view of an alternative embodiment of a star shaped dog.

FIGS. 1A, 1B, and 1C, FIG. 2 and FIG. 3 illustrate side pan views and perspective views of an exemplary fishhook 100 configured according to the method and apparatus disclosed herein. As shown, a fishhook comprises an eye 104 at a first connected or formed from a shank 108. In this exemplary embodiment the eye 104 forms an opening 112 configured to accept a fishing line, in the case of direct tied hook, a swivel, or other device or element that serves as an interface between the hook and the fishing line or leader. The eye 104 and its associated method of manufacture, assembly, location, composition, and the like may comprise any eye configuration known in the art or developed in the future. The eye 104 is generally understood by one of ordinary skill in the art of fishhooks and as such the eye is not described in detail herein.

The shank 108 comprises a generally straight or curved section that separates the eye 104 from a curved portion referred to herein as a bend 116. The bend 116 curves to a direction that is in one embodiment parallel to the shank 108. At a second end of the hook 100, is a point 118 configured to penetrate a fish to thereby set the hook.

The material of the hook 100 may be stamped, or formed or drawn from wire or metal stock. The material may comprise metal, plastic, ceramic, epoxy composite, a combination thereof or any other material having sufficient strength to hold a fish. In one embodiment the eye 104 may be formed from the material of the hook and looped back onto itself or the eye may stamped and thereby integrally formed from the material near of the first end.

The hook of FIGS. 1–3 further comprises one or more dogs 120 that, as shown, extends radially outwardly in one or more directions from the surface of the hook. As shown in FIGS. 1A, 1B, 1C and FIGS. 2–3, the dog 120 may be located at or near the second end 118. In this configuration, after the point 118 penetrates the fish, the dog 120 also penetrates the fish. After penetration, the structure of the dog 120, and in particular the protruding structure, prevent or inhibits the hook from dislodging from the fish.

It is further contemplated that one or more shank dogs 120 may be located on the shank 108 as shown in FIGS. 1B, 1C and FIG. 2. The shank dogs 120 may also function to hold the fish, or may be configured to hold bait (not shown) on the hook. With regard to bait, the shank dogs 120 also provide the advantage of securely holding the bait without tearing, ripping, or killing the bait as occurs with a prior art barb located on the shank. Further, the shank dogs 120 may allow for re-use of bait, which may be live or artificial.

In the embodiments of FIGS. 1–3, the dogs 120 comprise a toroidal shaped expanded area that extends from the surface of the bend portion 116 or shank portion 108 of the hook. Stated another way, the dog 120 may comprise an annular shaped expanded section having varying degrees of slope or curvature. In various embodiments, the toroidal or annular shaped region may extend around the entire circumference or only a portion of the hook.

In contrast to the prior art which utilized a barb, the dog as shown and described herein overcomes the drawbacks of the prior art by gripping or engaging the point of penetration without causing further serious damage such as would be created by a reversed pointed barb. As used herein, the term barb is defined to mean a sharp projection extending backward from the point of a fishhook such that the barb prevents easy extraction. As a result, the sharp projection that extends backward continues to cut and tear at the fish during landing of the fish.

The dog 120 of the present invention, however, does not cut or tear at the fish because the dog does not comprise a barb. Instead, the dog is configured with a non-cutting or tearing surface. As can be seen, in the various embodiments, the dog 120 is configured to be sufficiently resistive to motion to prevent or discourage the hook from leaving the mouth of the fish, but not so aggressive, sharp and angled as to unduly harm the fish.

In addition, during the catch and release process the dog equipped hook may be gently removed from the mouth of fish, and the fish returned to the water to swim away. With prior art barbed hooks, it is difficult to remove the hook, and indeed there are numerous patented fishhook removal devices (see U.S. Pat. Nos. 6,688,034; 6,588,075; 6,272, 788) that discuss the problems associated with trying to remove a barbed fishhook. Often, these devices further damage the fish and undesirably extend the period that the fish is out of the water.

In contrast, the fishhook with the dog configuration as described herein is easy for the fisherman or user to remove. As shown in FIG. 2, the resistance and damage established by the dog when the hook is set into the fish, i.e. moving in hook setting direction 130 is generally identical to the resistance and damage established by the dog 120 when the hook is moved in the hook removal direction 132. As can be seen, the dog is generally symmetric in shape and damage infliction when viewed from direction 130 as when viewed from direction 132. This is a characteristic that is not shared by prior art fishhooks and barbed fishhooks in particular.

It is further contemplated that more than one dog 120 may be established near the point 118, i.e. second end, of the bend 116. This provides additional gripping power by providing more than one raised structure against which or over which the point of penetration, on the fish, must pass before the fish can come loose. The second or more dogs 120 near the point 118 may also prevent the hook from moving too far into the mouth of the fish to thereby prevent the point from causing unwanted damage to the fish.

It is also contemplated that any of the dogs, may be a different size as compared to any of the other dogs. Moreover, any of the various dog shapes and configurations shown or described herein may be combined with any of the other dog shapes or configurations shown or described herein in any combination or arrangement.

It is contemplated that the dogs may be manufactured by swaging the hook material into the shapes shown herein. The term swage is defined to mean pushing or forcing the hook material to form a desired dog of the desired shape. The dogs may also be stamped, machined, tooled, cast, glued, formed of wrapped wire, forged, milled, cut, molded, or made in any other way now know or developed in the future. It is contemplated that the dog could also be formed separately from the hook and attached to the hook.

It is further contemplated that the material of the dog may be different from the material of the hook, such as the material that comprises the eye, shank, or bend. Alternatively, the dog may be coated with a material different from the material of the hook. By way of example and not limitation, the dog may comprise or be coated with rubber, silicon, or other surface that increases the friction between the dog, or area near the dog, to thereby inhibit the dog from coming out of the mouth of the fish, yet still not inflicting harm on the fish. Thus, the dog and area close thereto may be formed from or coated with a material to increases friction with the fish to inhibit unwanted release of the fish. It is also contemplated that both grippy (high-friction surfaces) and slippery (low friction surfaces) surfaces may be utilized on a single hook to provide a grip and slip type surface to achieve desired operation.

It is further contemplated that one or more areas, surfaces, or portions of the hook may be coated with or comprised of a material that is reduces friction, such as a slippery surface. In one embodiment the tip of the hook may be coated with a low friction material, such as Teflon. This would allow the hook to be set, i.e. penetrate the fish more easily and reduce harm to the fish. It is also possible to coat the shank with a low friction material to further reduce harm to the fish.

FIGS. 4 and 5 illustrate a perspective view of a hook having one or more cone shaped dogs located at one or more locations on the circumference or outer surface of the hook. In these figures, identical reference numbers are used to identify identical or generally similar elements. As such, a discussion of previously described elements is not repeated. In contrast to the dog 120 of FIGS. 1–3, the dog 420 of FIGS. 4–5 comprises one or more cone shaped protrusions having a base connected to or formed integral from the hook material.

As discussed above, the dog(s) 420 may be located at any location on the hook, namely anywhere on the shank 108, or bend 116. In the embodiment shown in FIGS. 4–5, the one or more dogs 420 are located on the shank 108 near the eye 104 and near the second end that is fashioned into a point 118.

It is contemplated that the cone shaped dogs 420 function similar to the dogs described above in connection with FIGS. 1–3. The one or more cone shaped dogs 420 may be placed at any radial position around the surface of the hook. For example, although FIGS. 4–5 show cones that completely encircle the outer circumference of the material of the hook, it is contemplated that a fewer number of cones may be strategically placed, such as one either or both of the inner and outer surfaces of the bend 116 to enable maximum fish holding power yet minimizing damage to the fish. As can be seen, the shape of the cone dog 420 is symmetric when viewed or analyzed in a hook setting direction 130 and a hook removal direction 132.

FIGS. 6A and 6B illustrate a perspective view of an alternative dog configuration. In these figures, identical reference numbers are used to identify identical or generally similar elements. As such, a discussion of previously described elements is not repeated. As shown, on the bend 116 of the hook is a dog 620 configured in a star shaped pattern. The star shaped dog 620 is configured with a front surface and a back surface that rise up from the surface of the bend 116. The front and back surface may be separated by a distance D, which is any distance configured to sufficiently hold the hook to the fish. The outer radial edge of the front and back surface rises toward and away from the surface of the bend 116 to form a V or star pattern. A single V may be formed or the star shaped V pattern may ring a portion of or the entire surface of the bend 116 of the hook as shown. The star pattern is not limited to this particular shape or configuration.

FIGS. 7 and 8 illustrate a perspective view an example dog configuration comprising one or more nubs. The dogs 704 configured as nubs may be located at any location on the hook, such as anywhere on the bend 116 or the shank. As shown, the nub 704 comprises a small bump or nipple that protrudes from the surface of the hook. One or more nub dogs 704 may be placed at various locations on the hook, such as in the bend to securely hold the fish without harming the fish upon removal of the hook. Likewise, one or more dogs 1020 may be utilized on the shank to hold bait or for other purposes.

FIGS. 9 and 10 illustrate a dog 920 configured as a band located around the entire circumference of the hook. In this configuration, the dog 920 has at least one side surface 924 that slopes inward toward the hook to thereby undercut the top surface 930. This configuration may be referred to as an inwardly tapered dog. This configuration is different than the dog shown in FIGS. 1–3 wherein the side surface comprises a rounded, outward sloping side surface. It is contemplated that in certain situations this may be a desirable dog configuration. It is further contemplated that the top surface 930 of the dog 920, or of any other dog or raised surface shown or described herein, may be generally rough, having micro edges that run the direction of the hook, as shown, in the direction of the dog, i.e. perpendicular to the direction of the point 118, or rough such as the surface of sandpaper. A rough upper surface 930 may prevent the hook from easily coming out of the fish but yet not cause harm to the fish.

FIGS. 10 and 11 illustrate alternative dog configurations. As shown in FIG. 10, the dog 1020 may comprise a raised surface or structure having a generally uneven upper surface and as shown in FIG. 11 extend only a portion of the circumference of the bend or shank portion of the hook. Likewise, one or more dogs 1020 may be utilized.

FIG. 12 illustrates a perspective view of a dog 1220 having a configuration similar to that shown in FIGS. 6A and 6B, but wherein the depressions in the top surface 1230 that form the V in the upper surface are not as deep as those shown in FIGS. 6A and 6B. The side surfaces 1238 may be perpendicular to the surface of the hook, such as the bend 116 or the side surface may be angled or sloped either inward or outward. The star shaped pattern, having any size depression, may work to resist sidewise motion and thereby hold the hook in the fish's mouth.

Figure 13:
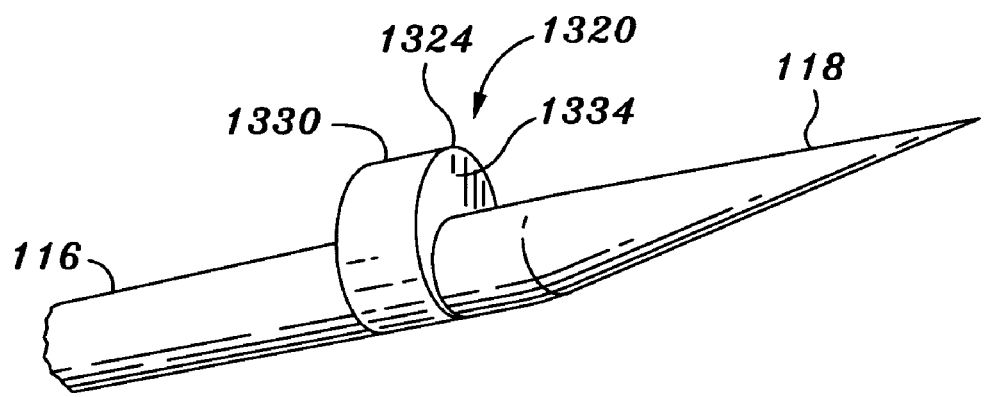
FIG. 13 illustrates a perspective view of a crescent shaped dog.

FIG. 13 illustrates a perspective view of yet another dog configuration. In this embodiment the dog 1320 comprises a raised structure having a crescent shaped upper edge 1324 and a lower edge that contacts the hook. The side surfaces 1334 may be generally perpendicular to the top surface 1330 and the hook surface 116. As shown in this embodiment, the crescent dog 1320 does not fully encircle the entire circumference of the hook. As such, the protruding structure may be located anywhere on the hook and may face in any direction on the surface of the hook.

As would be contemplated by one of ordinary skill in the art, the one or more dogs may have sides that suit the particular use of the hook or configured to suit the needs of the fisher or sportsman. In addition, it is contemplated that the size of the dog may vary depending on the fishing season, the type of fish being sought, or the skill of the fisher.

While various embodiments of the invention have been described, it will be apparent to those of ordinary skill in the art that many more embodiments and implementations are possible that are within the scope of this invention.

What is claimed is:

1. A non-barbed fishhook comprising:
a non-barbed hook having a point at an end of the hook, a portion of the non-barbed hook comprising a shank having a first end and a second end and a bend having a first end and a second end;
a portion of the shank having an eye near the first end of the shank;
the first end of the bend coupled to the second end of the shank, the second end of the bend coupled to the point;
at least one non-barbed dog extending around the entire circumferences of at least a portion of the bend, wherein the at least one non-barbed dog is configured to engage a fish, wherein the at least one non-barbed dog is toroidal shaped.

2. The fishhook of claim 1, further comprising at least one non-barbed dog located on the shank near the first end of the shank.

3. The fishhook of claim 2, further comprising at least one raised surface having a toroidal shape located on the shank near the first end of the shank.

4. The fishhook of claim 3, wherein the at least one raised toroidal shaped surface engages the fish to prevent the fish from coming loose from the hook, but does not further harm the fish upon removal of the hook from the fish.

5. The fishhook of claim 1, wherein the shank has a circular cross section.

6. The fishhook of claim 1, wherein the eye is configured to accept at least one of a swivel and a fishing line.

7. The fishhook of claim 1, wherein the fishhook is formed from a continuous piece of metal.

8. The fishhook of claim 1, wherein the non-barbed dog is a permanent portion of the hook during repeated use of the fishhook.

9. A non-barbed hook comprising:
a non-barbed hook having a first end and a second end, a portion of the second end of the hook having a pointed shape;
an eye having an opening therein formed at the first end of the non-barbed hook;
a shank portion extending from the eye;
a bend portion comprising at least one non-barbed raised surface having a substantially symmetric shape, the bend portion extending from the shank portion, the bend portion terminating at the second end, the at least one non-barbed raised surface configured to engage a mouth of a fish thereby hindering the fish from coming loose from the non-barbed hook when set in the mouth of the fish and to reduce laceration of the mouth of the fish when the non-barbed hook is removed from the mouth of the fish and wherein the non-barbed raised surface extends around the entire outer circumference of the portion of the bend where the non-barbed raised surface is located;
wherein the non-barbed raised surface comprises one or more toroidal shaped dogs, star shaped dogs, nubs, or cones.

10. The hook of claim 9, further comprising at least one non-barbed raised surface on the shank portion.

11. The fishhook of claim 9, wherein the non-barbed raised surface is on the pointed shape side of the bend.

12. The fishhook of claim 9, wherein the non-barbed raised surface is a permanent portion of the fishhook during repeated use of the hook.

13. A non-barbed fishhook comprising:
a non-barbed hook having a point at an end of the hook, a portion of the non-barbed hook comprising a shank having a first end and a second end and a bend having a first end and a second end;
a portion of the shank having an eye near the first end of the shank;
the first end of the bend coupled to the second end of the shank, the second end of the bend coupled to the point;
at least one non-barbed dog extending around the entire circumference of at least a portion of the bend, wherein the at least one non-barbed dog is configured to engage a fish, wherein no portions of the fishhook are dissolvable in water or fish enzymes.

14. A non-barbed fishhook comprising:
a non-barbed hook having a point at an end of the hook, a portion of the non-barbed hook comprising a shank having a first end and a second end and a bend having a first end and a second end;
a portion of the shank having an eye near the first end of the shank; the first end of the bend coupled to the second end of the shank, the second end of the bend coupled to the point;
at least one non-barbed dog extending around the entire circumference of at least a portion of the bend, wherein the at least one non-barbed dog is configured to engage a fish, wherein the non-barbed raised surface is formed from the same material as the shank or bend.

* * * * *